United States Patent
Takahashi et al.

(10) Patent No.: US 6,863,052 B2
(45) Date of Patent: Mar. 8, 2005

(54) KNOCKING CONTROL APPARATUS AND METHOD AND ENGINE CONTROL UNIT FOR VARIABLE CYLINDER INTERNAL COMBUSTION ENGINE

(75) Inventors: Shunji Takahashi, Saitama-ken (JP); Toshihiko Sato, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/836,263

(22) Filed: May 3, 2004

(65) Prior Publication Data

US 2004/0226539 A1 Nov. 18, 2004

(30) Foreign Application Priority Data

May 16, 2003 (JP) ........................................ 2003-139594

(51) Int. Cl.[7] ................................................. F02P 5/00
(52) U.S. Cl. ............................ 123/406.13; 123/406.16; 123/481; 123/198 D; 701/111
(58) Field of Search ....................... 123/406.13, 406.16, 123/481, 198 D, 198 F, 198 DB, 198 DC; 701/111

(56) References Cited

U.S. PATENT DOCUMENTS

| | | | | |
|---|---|---|---|---|
| 5,417,191 A | * | 5/1995 | Togai et al. | 123/333 |
| 5,425,335 A | * | 6/1995 | Miyamoto et al. | 123/198 F |
| 5,492,100 A | * | 2/1996 | Ishii et al. | 123/481 |
| 5,505,176 A | * | 4/1996 | Ishii et al. | 123/406.4 |
| 5,562,086 A | * | 10/1996 | Asada et al. | 123/568.21 |
| 5,890,467 A | * | 4/1999 | Romzek | 123/299 |
| 2004/0221832 A1 | * | 11/2004 | Shunji et al. | 123/339.15 |

FOREIGN PATENT DOCUMENTS

| | | | | |
|---|---|---|---|---|
| JP | 60048 | * | 4/1984 | F02D/33/00 |
| JP | 60049 | * | 4/1984 | F02D/33/00 |
| JP | 36736 | * | 2/1985 | F02P/17/02 |

* cited by examiner

*Primary Examiner*—Hai Huynh
(74) *Attorney, Agent, or Firm*—Arent Fox PLLC

(57) ABSTRACT

A knocking control apparatus for a variable cylinder internal combustion engine avoids erroneous determination of knocking during a fault in a cylinder pausing mechanism to appropriately control knocking associated with the ignition timing, thereby preventing engine stall and reducing a deterioration in a catalyst. The variable cylinder internal combustion engine can be switched between a full cylinder operation mode in which all of a plurality of cylinders are operated, and a partial cylinder operation mode in which part of the plurality of cylinders is paused by a cylinder pausing mechanism. The knocking control apparatus comprises a knocking sensor for detecting knocking of the variable cylinder internal combustion engine, and an ECU for performing a knocking control to correct an ignition timing toward a retarding side when knocking is detected, determining whether or not the cylinder pausing mechanism fails, and suspending the knocking control when the fault determining means determines that the cylinder pausing mechanism is determined to fail.

6 Claims, 2 Drawing Sheets

F I G. 2
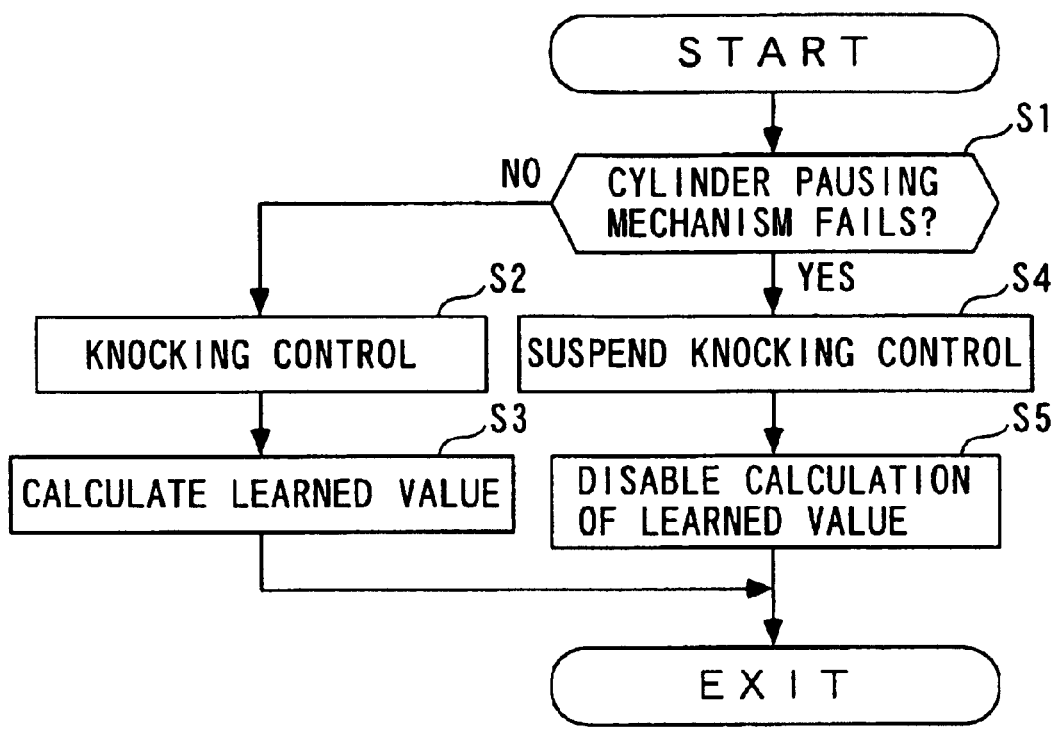
F I G. 3
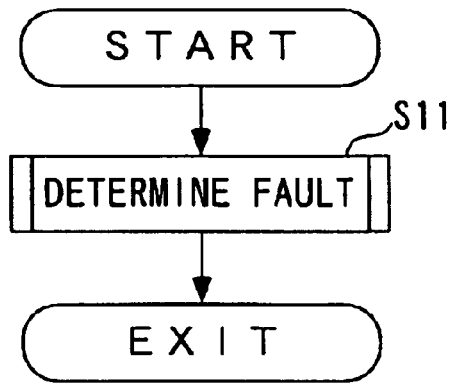

KNOCKING CONTROL APPARATUS AND METHOD AND ENGINE CONTROL UNIT FOR VARIABLE CYLINDER INTERNAL COMBUSTION ENGINE

BACKGROUND OF THE INVENTION

1. Field of the Invention

The present invention relates to a knocking control apparatus and method and an engine control unit for a variable cylinder internal combustion engine which can be switched between a full cylinder operation mode for operating all of a plurality of cylinders and a partial cylinder operation mode for pausing some of the plurality of cylinders by a cylinder pausing mechanism.

2. Description of the Prior Art

Conventionally, Laid-open Japanese Patent Application No. 7-103060, for example, describes a knocking control apparatus for a variable cylinder internal combustion engine. In this internal combustion engine, all of four cylinders are operated in a full cylinder operation mode, while two of the four cylinders are paused by a cylinder pausing mechanism in a partial cylinder operation mode. The internal combustion engine is also provided with a knocking sensor for detecting knocking. The knocking sensor detects vibrations of the internal combustion engine for each cylinder to output a knocking detection signal. This knocking control apparatus determines based on the output knocking detection signal whether the knocking signal indicates knocking or seating noise which can be associated with opening/closing of intake and exhaust valves. Specifically, when the locking detection signal has a vibration level equal to or higher than a threshold, it is determined that the knocking is occurring. On the other hand, when the vibration level is lower than the threshold, the knocking detection signal is determined to represent seating noise. Then, when it is determined that the knocking is occurring, a knocking control procedure is performed to correct a basic ignition timing, which has been set based on an operating condition of the internal combustion engine, toward the retarding side in order to suppress the knocking.

This knocking control apparatus is also configured to set the threshold for the partial cylinder operation mode to be larger than the threshold for the full cylinder operation mode, thereby avoiding erroneous determination which could be made if a single threshold is set in both the operation mode.

As described above, the conventional knocking control apparatus for a variable cylinder internal combustion engine determines knocking or seating noise in accordance with a vibration level detected by the knocking sensor, whether or not it is equal to or higher than the threshold. However, the foregoing knocking control apparatus has a problem of the inability to appropriately set the threshold if it cannot control the engine in a set operation mode, for example, due to a fault in a cylinder pausing mechanism, and cannot determine the number of actually operated cylinders.

For example, if the engine cannot normally return to the full cylinder operation mode due to a fault in the cylinder pausing mechanism which disables the engine to switch from the partial cylinder operation mode to the full cylinder operation mode, the number of actually operated cylinder will be less than the essential number of operated cylinders in the full cylinder operation mode. Therefore, if the knocking control apparatus uses a lower threshold for the full cylinder operation for the determination of knocking in this state, the knocking control apparatus can erroneously determine seating noise as knocking even though no knocking is actually occurring. In this event, the erroneous detection of knocking would erroneously correct the ignition timing toward the retarding side, possibly resulting in higher temperatures of exhaust gases and earlier deterioration of catalyst.

On the other hand, when the cylinder pausing mechanism fails in a manner reverse to the above, where the knocking control apparatus cannot switch the engine from the full cylinder operation mode to the partial cylinder operation mode, all the cylinders are continuously operated without correctly pausing appropriate cylinders. When the knocking control apparatus uses a larger threshold for the partial cylinder operation mode for the determination of knocking in this state, the knocking control apparatus fails to determine knocking, even though it is actually occurring, and therefore can fail to correctly detect the knocking, contrary to the foregoing. In this event, the ignition timing is not corrected toward the retarding side, while the knocking is occurring, and is continuously controlled toward the advancing side, eventually resulting in engine stall.

SUMMARY OF THE INVENTION

The present invention has been made to solve the problems mentioned above, and it is an object of the invention to provide a knocking control apparatus and method and an engine control unit for a variable cylinder internal combustion engine which are capable of appropriately carrying out a knocking control associated with an ignition timing by avoiding erroneous determination on knocking in the event of a fault in a cylinder pausing mechanism, thereby preventing the engine stall and reducing the deterioration of the catalyst.

According to a first aspect of the present invention, there is provided a knocking control apparatus for a variable cylinder internal combustion engine which can be switched between a full cylinder operation mode in which all of a plurality of cylinders are operated, and a partial cylinder operation mode in which part of the plurality of cylinders is paused by a cylinder pausing mechanism. The apparatus is characterized by comprising knocking detecting means for detecting knocking of the variable cylinder internal combustion engine; knocking control means for performing a knocking control to correct an ignition timing to retard when the knocking detecting means detects knocking; fault determining means for determining whether or not the cylinder pausing mechanism fails; and knocking control suspending means for suspending the knocking control by the knocking control means when the fault determining means determines that the cylinder pausing mechanism fails.

According to this knocking control apparatus for a variable cylinder internal combustion engine, the internal combustion engine is switched between the full cylinder operation mode and partial cylinder operation mode. In the partial cylinder operation mode, part of the cylinders are paused by the cylinder pausing mechanism. Also, as the knocking detecting means detects knocking, the knocking control means performs the knocking control for correcting the ignition timing toward the retarding side. Further, as the fault determining means determines a fault in the cylinder pausing mechanism, the knocking control suspending means suspends the knocking control. In a situation in which a fault in the cylinder pausing mechanism prevents correct identification of the number of actually operated cylinders, the detection of knocking made by the knocking detecting means is damaged in reliability. Therefore, by suspending the knocking control when the cylinder pausing mechanism fails, the knocking control apparatus can appropriately control the ignition timing while eliminating adverse influences of erroneously detected knocking. In this way, the knocking control apparatus can prevent engine stall when the cylinder pausing mechanism fails to disable the engine to return to the full cylinder operation mode, and can reduce a deterioration in a catalyst when the cylinder pausing mechanism fails to disable the engine to return to the partial cylinder operation mode.

To achieve the above object, according to a second aspect of the present invention, there is provided a knocking control method for a variable cylinder internal combustion engine which can be switched between a full cylinder operation mode in which all of a plurality of cylinders are operated, and a partial cylinder operation mode in which part of the plurality of cylinders is paused by a cylinder pausing mechanism. The method is characterized by comprising the steps of detecting knocking of the variable cylinder internal combustion engine; performing a knocking control to correct an ignition timing toward a retarding side when knocking is detected; determining whether or not the cylinder pausing mechanism fails; and suspending the knocking control when the cylinder pausing mechanism is determined to fail.

This knocking control method provides the same advantageous effects as described above concerning the knocking control apparatus according to the first aspect of the invention.

To achieve the above object, according to a third aspect of the present invention, there is provided an engine control unit including a control program for causing a computer to perform a knocking control for a variable cylinder internal combustion engine which can be switched between a full cylinder operation mode in which all of a plurality of cylinders are operated, and a partial cylinder operation mode in which part of the plurality of cylinders is paused by a cylinder pausing mechanism, wherein the program causes the computer to detect knocking of the variable cylinder internal combustion engine; perform a knocking control to correct an ignition timing toward a retarding side when knocking is detected; determine whether or not the cylinder pausing mechanism fails; and suspending the knocking control when the cylinder pausing mechanism is determined to fail.

This engine control unit provides the same advantageous effects as described above concerning the knocking control apparatus according to the first aspect of the invention.

Preferably, the knocking control apparatus for a variable cylinder internal combustion engine described above further comprises learning means for learning in relation to the knocking control during the knocking control performed by the knocking control means; and learning disabling means for disabling the learning means to learn when the knocking control suspending means suspends the knocking control.

According to this preferred embodiment of the knocking control apparatus for a variable cylinder internal combustion engine, when the knocking control is suspended, the learning disabling means disables the learning means to learn. As described above, since the number of actually operated cylinders cannot be correctly identified when the cylinder pausing mechanism fails, a calculated learned value would be poor in reliability even if the learning means learns in relation to the knocking control. Therefore, in such a situation, the learning disabling means disables the learning, thereby permitting the knocking control apparatus to appropriately perform the knocking control without using the unreliable learned value.

Preferably, the knocking control method for a variable cylinder internal combustion engine described above further comprising the steps of learning in relation to the knocking control during the knocking control; and disabling the step of learning when the knocking control is suspended.

This preferred embodiment of the knocking control method provides the same advantageous effects as provided by the corresponding preferred embodiment of the knocking control apparatus according to the first aspect of the invention.

Preferably, in the engine control unit described above, the program further causes the computer to learn in relation to the knocking control during the knocking control; and disable the learning when the knocking control is suspended.

This preferred embodiment of the engine control unit provides the same advantageous effects as provided by the corresponding preferred embodiment of the knocking control apparatus according to the first aspect of the invention.

BRIEF DESCRIPTION OF THE DRAWINGS

FIG. 2 is a flow chart illustrating a routine for a knocking control procedure; and FIG. 3 is a flow chart illustrating a routine for determining a fault in a cylinder pausing mechanism.

DETAILED DESCRIPTION OF THE EMBODIMENTS

Figure 1:
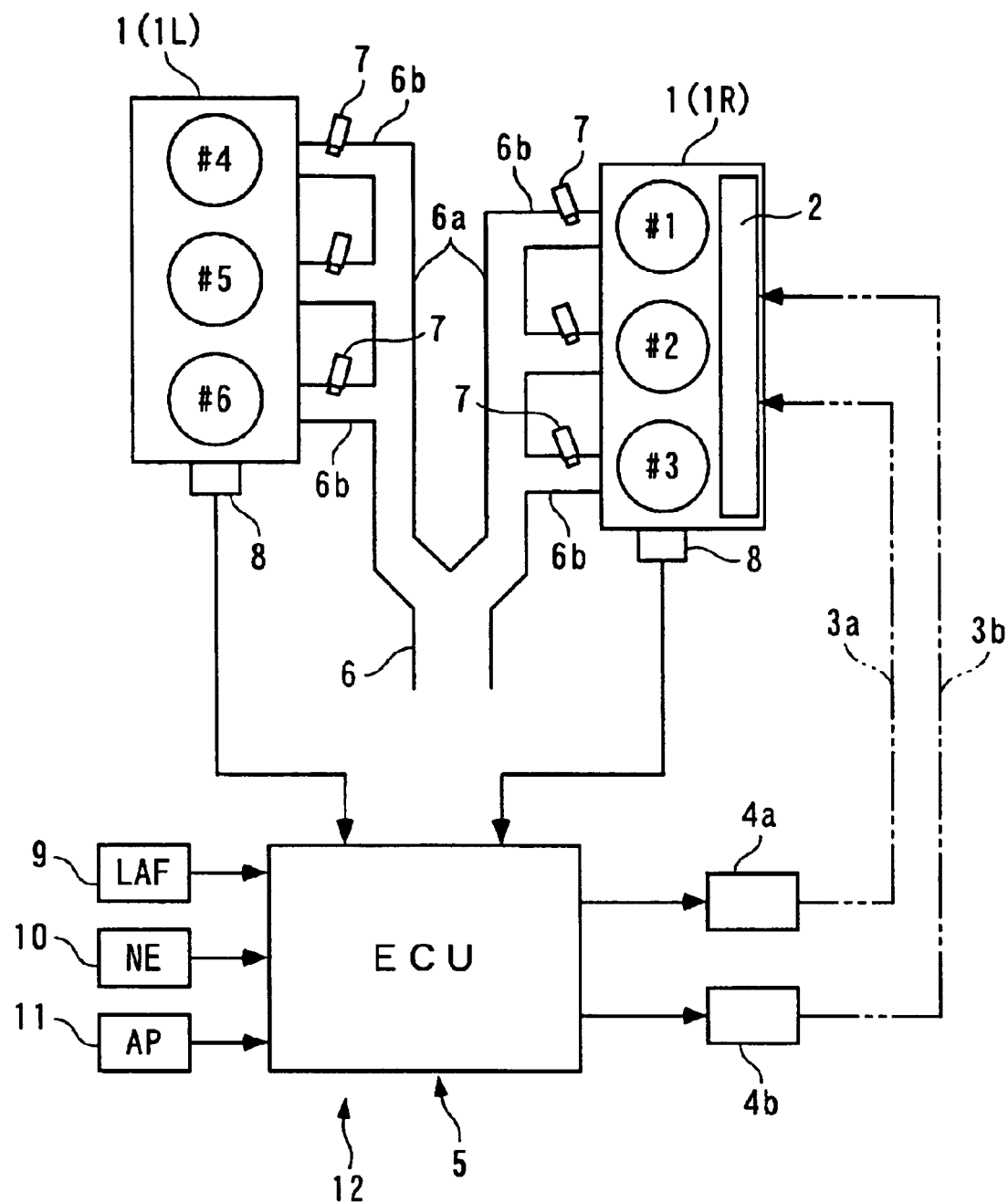
FIG. 1 is a block diagram generally illustrating the configuration of a variable cylinder internal combustion engine in which a knocking control apparatus is applied in accordance with one embodiment of the present invention

In the following, a preferred embodiment of the present invention will be described with reference to the accompanying drawings. FIG. 1 generally illustrates the configuration of a variable cylinder internal combustion engine in which a knocking control apparatus 12 is applied in accordance with one embodiment of the present invention. The illustrated variable cylinder internal combustion engine (hereinafter simply called the "engine") 1 is a V-type six-cylinder DOHC gasoline engine which is equipped in a vehicle, not shown.

As illustrated in FIG. 1, the engine 1 comprises three cylinders #1, #2, #3 on a right bank 1R, and three cylinders #4, #5, #6 on a right bank 1R. The engine 1 is switched in operation between a full cylinder operation mode and a partial cylinder operation mode. Additionally, a cylinder pausing mechanism 4 is provided on the right bank 1R for executing the partial cylinder operation mode.

The cylinder pausing mechanism 2 is connected to a hydraulic pump, not shown, through oil passages 3a, 3b. Electromagnetic valves 4a, 4b are disposed between the hydraulic pump and cylinder pausing mechanism 2 for an intake valve and an exhaust valve, respectively. Both of the electromagnetic valves 4a, 4b, which are normally closed, are electrically connected to the ECU 2, and open the oil passages 6a, 6b, respectively, when they are turned on in response to associated driving signals from the ECU 2. In the partial cylinder operation mode, both the electromagnetic valves 4a, 4b are turned on to open the oil passages 3a, 3b to supply the cylinder pausing mechanism 2 with an oil pressure from the hydraulic pump. In this way, communications are blocked between the intake valve and an intake cam and between the exhaust valve and an exhaust cam (neither of which is shown in FIG. 1) in each of the cylinders #1–#3 in the right bank 1R, thereby bringing the intake valve and exhaust valve into a pause mode (close mode).

On the other hand, the full cylinder operation is reverse to the foregoing in that both the electromagnetic valves 4a, 4b are turned off to close the oil passages 6a, 6b, thereby preventing the cylinder pausing mechanism 2 from being supplied with an oil pressure from the hydraulic pump. In this way, the blocking is released between the intake valve and intake cam and between the exhaust valve and exhaust cam, thereby making the intake valve and exhaust valve operable.

An intake pipe 6 is connected to the six cylinders #1–#6 through an intake manifold 6a. At each branch 6b of the intake manifold 6a, an injector 7 is attached opposite to the intake port (not shown) associated with each cylinder. These injectors 7 are driven in response to a driving signal from the ECU 2 during the full cylinder operation of the engine 3 to inject the fuel into the respective branches 6b from all the injectors 7. In the partial cylinder operation, on the other hand, three injectors 7 associated with the right bank 1R are controlled to stop injecting the fuel.

In the foregoing manner, in the partial cylinder operation mode, the three cylinders #1–#3 on the right bank 1R are paused by closing the intake valves and exhaust valves and stopping the injection of the fuel from the associated injectors 7. In the full cylinder operation mode, on the other hand, the six cylinders #1–#6 are all operated.

A knocking sensor 8 is attached on each of the right bank 1R and left bank 1L of the engine 1. Each of the knocking sensors 8, which is of a piezoelectric type, detects vibrations of the right bank 1R or left bank 1L to output a signal indicative of vibrations (hereinafter called the "knocking detecting signal") to an engine control unit (ECU) 5.

The ECU 5 is also connected to a LAF sensor 9; an engine rotational speed sensor 10, and an accelerator opening sensor 11. The LAF sensor 9 linearly detects an oxygen concentration VLAF within exhaust gases, and outputs a detection signal in proportion to the oxygen concentration VLAF. The engine rotational speed sensor 10 detects an engine rotational speed NE, while the accelerator opening sensor 11 detects the amount of treading (hereinafter called the "accelerator opening") AP on an accelerator pedal (not shown) of a vehicle (not shown) equipped with the engine 1. Signals indicative of the detected engine rotational speed NE and accelerator opening AP are output to the ECU 5. The engine rotational speed sensor 10 also outputs a TDC signal to the ECU 5 at a timing near the top dead center before an intake stroke of a piston (not shown) in the cylinders #1–#6.

The ECU 5, which implements knocking detecting means, knocking control means, fault determining means, knocking control suspending means, learning means, and learning disabling means, is based on a microcomputer which comprises an I/O interface, a CPU, a RAM, a ROM, and the like. The detection signals from a variety of sensors 8–11 mentioned above are applied to the CPU, later described, through the I/O interface.

The CPU determines a particular operating condition of the engine 1 based on these detection signals in accordance with a program stored in the ROM, and executes a variety of control processing as follows, in accordance with an operating condition of the engine 1 determined thereby. First, the CPU determines whether engine 1 should be operated in the full cylinder operation mode or in the partial cylinder operation mode. Specifically, the CPU executes the partial cylinder operation mode when the engine rotational speed NE is within a predetermined range (for example, form 1,000 to 3,500 rpm), or when the accelerator opening AP is below a table value previously set in accordance with the engine rotational speed NE, and otherwise executes the full cylinder operation mode.

The ECU 5 conducts a knocking control procedure based on the knocking detection signal generated by the knocking sensor 8. FIG. 2 illustrates a routine for the knocking control procedure which is executed in synchronism with the generation of a TDC signal.

As illustrated in FIG. 2, the ECU 5 first determines at step 1 (abbreviated as "S1" in FIG. 2. The same is applied to the subsequent figures) whether or not the cylinder pausing mechanism 2 fails. FIG. 3 illustrates a subroutine for determining a fault in the cylinder pausing mechanism 2. The determination may be made, for example, in the following manner. For switching the operation mode from the partial cylinder operation mode to the full cylinder operation mode, the ECU 5 stops supplying an oil pressure to the cylinder pausing mechanism 2, while no fuel is being supplied to the cylinders #1–#3 on the right bank 1R, thereby making the intake and exhaust valves operable.

The ECU 5 compares the oxygen concentration VLAF detected in this state with a predetermined value to determine based on the result of the comparison whether or not the cylinder pausing mechanism 2 fails. Specifically, if a fault in the cylinders #1–#3 on the right bank 1R causes the intake and exhaust valves to remain closed even though the ECU 5 controls them to be operable, the oxygen concentration VLAF hardly varies, and therefore will not reach the predetermined value. It is therefore possible to determined that the cylinder pausing mechanism 2 fails to disable the engine 1 to normally return from the partial cylinder operation mode to the full cylinder operation mode when the oxygen concentration VLAF is lower than the predetermined value.

On the other hand, when the cylinders #1–#3 are normal, the oxygen concentration VLAF increases at a larger changing rate than before immediately after the exhaust valves associated with the cylinders #1–#3 have been opened. Thus, the cylinder pausing mechanism 2 can be determined to be normal when the oxygen concentration VLAF is equal to or higher than the predetermined value.

Similarly, for switching the operation mode from the full cylinder operation mode to the partial cylinder operation mode, the ECU 5 controls the intake and exhaust valves to pause, while no fuel is supplied to the cylinders #1–#3 on the right bank 1R. Then, if the oxygen concentration VLAF detected in this state is higher than the predetermined value, the ECU 5 can determine that the cylinder pausing mechanism 2 fails to disable the engine to switch from the full cylinder operation mode to the partial cylinder operation mode, on the assumption that the intake and exhaust valves still remain operative though the ECU 5 has controlled them to pause.

Turning back to FIG. 2, if the result of the determination at step 1 is NO, indicating the cylinder pausing mechanism 2 is normal, the routine proceeds to step 2, where the ECU 5 executes the knocking control in response to the knocking detection signal from the locking sensor 8.

Specifically, the ECU 5 determines that the knocking detection signal indicates seating noise when a vibration level represented by the knocking detection signal is lower than a predetermined knocking determination value, and that the knocking detection signal indicates knocking when the vibration level is equal to or higher than the predetermined knocking determination value. It should be noted that a different knocking determination value is set separately for each of the full cylinder operation mode and partial cylinder operation mode. By thus setting the knocking determination values, the ECU 5 can appropriately determine knocking in the respective operation modes. Then, upon determination of knocking, the ECU 5 corrects the ignition timing toward the retarding side by subtracting a knocking correction term from a basic ignition timing which has been set based on the operating condition of the engine 1, in order to suppress the knocking.

At step 3 subsequent to step 2, the ECU 5 calculates a learned value related to the knocking control, followed by termination of the knocking control routine. The calculation of the learned value involves the following calculation of a learned value for an octane value estimate which is used as a correction term for the ignition timing. First, the ECU 5 estimates an octane value of a currently used fuel from the relationship between a reference ignition timing corresponding to a critical ignition timing of knocking which occurs when a minimum octane-value fuel is used, and an actual knocking occurring ignition timing which is detected based on the knocking detection signal, and defines it as a current octane value estimate. Next, the ECU 5 takes a weighted average of the current octane value estimate and a learned value so far derived, using a weighting coefficient, to calculate a learned value for the octane value estimate. The ECU 5 adds the learned value calculated in this way to the reference ignition timing as one correction term, thereby correcting the ignition timing toward the advancing side. Thus, the ignition timing is set near a limit at which no knocking occurs, while reflecting the knocking characteristic in accordance with the octane value of the actually used fuel.

Turning back to FIG. 2, if the result of the determination at step 1 is YES, i.e., if the ECU 5 determines that the cylinder pausing mechanism 2 fails, the routine proceeds to step 4, where the ECU 5 suspends the knocking control. In other words, the ECU 5 avoids the correction of the ignition timing in accordance with the knocking determination based on the knocking detection signal. At step 5 subsequent to step 4, the ECU 5 disables the calculation of the learned value related to the knocking control, followed by termination of the knocking control routine. In this event, the learned value for the octane value estimate may be set, for example, to the octane value of a minimum octane-value fuel.

As described above, the knocking control apparatus 12 suspends the knocking control when it determines that the cylinder pause mechanism 2 fails, and therefore does not correct the ignition timing in accordance with the knocking determination based on the knocking detection signal. In this embodiment, though the ECU 5 is capable of roughly determining a fault in the cylinder pausing mechanism 2, it does not have the ability to determine whether all or part of the cylinders #1–#3 fails upon determination of a fault. In such a situation in which the knocking control apparatus 12 cannot identify the number of actually operated cylinders, the reliability will be damaged for the knocking determination based on the knocking detection signal. Therefore, by suspending the knocking control when the cylinder pausing mechanism 2 is determined to fail, the knocking control apparatus 12 can appropriately control the ignition timing while eliminating adverse influences due to erroneously detected knocking.

Consequently, when the cylinder pausing mechanism 2 fails to disable the engine 1 to return to the full cylinder operation mode, the knocking control apparatus 12 can avoid erroneously determining knocking as seating noise to circumvent a correction of the ignition timing toward the advancing side, thereby preventing the engine stall. Contrary to the foregoing, when the cylinder pausing mechanism 2 fails to disable the engine 1 to return to the partial cylinder operation mode, the knocking control apparatus 12 can avoid erroneously determining seating noise as knocking to circumvent a correction of the ignition timing toward the retarding side, thereby reducing a deterioration in the catalyst.

Also, when a fault in the cylinder pausing mechanism 2 causes the knocking control apparatus 12 to suspend the knocking control, the knocking control apparatus 12 disables the calculation of a learned value for an octane value estimate. As described above, since the number of actually operated cylinders cannot be correctly identified when the cylinder pausing mechanism 2 fails, a calculated learned value would be poor in reliability even if the knocking control apparatus 12 calculates the learned value for the octane value estimate. Therefore, in such a situation, the knocking control apparatus 12 disables the calculation of a learned value, and can appropriately correct the ignition timing based on the octane value estimate without using the unreliable learned value.

It should be understood that the present invention is not limited to the embodiment described above, but may be practiced in a variety of manners. For example, while the foregoing embodiment has shown an example in which the three cylinders #1–#3 on the right bank 1R are paused in the partial cylinder operation mode, the number of cylinders paused in the partial cylinder operation mode is not limited to this particular number, as a matter of course. For example, in a variable cylinder internal combustion engine having N cylinders, an arbitrary number of cylinders may be paused in a range of one to N-1. Also, while the knocking control apparatus calculates a learned value for an octane value estimate as related to the knocking control, the learned value may be calculated for another parameter related to the knocking control. Further, while the knocking sensors 8 are provided one by one for the banks 1R, 1L, only one knocking sensor may be provided instead for the entire engine 1. Alternatively, one knocking sensor may be provided for each of the cylinders #1–#6. In the former case, the manufacturing cost can be reduced by a reduced number of parts, while in the latter case, the knocking can be detected for each cylinder to improve the resulting knocking control in exactitude. Also, the knocking control apparatus of the present invention is not limited to a variable cylinder internal combustion engine equipped in a vehicle, but can be applied to a variety of industrial variable cylinder internal combustion engines including an engine for a ship propeller such as an outboard engine which has a crank shaft oriented in the normal direction. Otherwise, the present invention can be modified in detailed configuration as appropriate without departing from the spirit and scope of the invention as defined by the appended claims.

As described above in detail, the knocking control apparatus for a variable cylinder internal combustion engine according to the present invention can advantageously avoid erroneous determination of knocking during a fault in a cylinder pausing mechanism to appropriately control knocking associated with the ignition timing, thereby preventing engine stall, and reducing a deterioration in the catalyst.

What is claimed is:

1. A knocking control apparatus for a variable cylinder internal combustion engine which can be switched between a full cylinder operation mode in which all of a plurality of cylinders are operated, and a partial cylinder operation mode in which part of the plurality of cylinders is paused by a cylinder pausing mechanism, said apparatus comprising:

knocking detecting means for detecting knocking of said variable cylinder internal combustion engine;

knocking control means for performing a knocking control to correct an ignition timing toward a retarding side when said knocking detecting means detects knocking;

fault determining means for determining whether or not said cylinder pausing mechanism fails; and knocking control suspending means for suspending said knocking control by said knocking control means when said fault determining means determines that said cylinder pausing mechanism fails.

2. A knocking control apparatus for a variable cylinder internal combustion engine according to claim 1, further comprising:

learning means for learning in relation to said knocking control during said knocking control performed by said knocking control means; and learning disabling means for disabling said learning means to learn when said knocking control suspending means suspends said knocking control.

3. A knocking control method for a variable cylinder internal combustion engine which can be switched between a full cylinder operation mode in which all of a plurality of cylinders are operated, and a partial cylinder operation mode in which part of the plurality of cylinders is paused by a cylinder pausing mechanism, said method comprising the steps of:

detecting knocking of said variable cylinder internal combustion engine;

performing a knocking control to correct an ignition timing toward a retarding side when knocking is detected;

determining whether or not said cylinder pausing mechanism fails; and suspending said knocking control when said cylinder pausing mechanism is determined to fail.

4. A knocking control method for a variable cylinder internal combustion engine according to claim 3, further comprising the steps of:

learning in relation to said knocking control during said knocking control; and disabling said step of learning when said knocking control is suspended.

5. An engine control unit including a control program for causing a computer to perform a knocking control for a variable cylinder internal combustion engine which can be switched between a full cylinder operation mode in which all of a plurality of cylinders are operated, and a partial cylinder operation mode in which part of the plurality of cylinders is paused by a cylinder pausing mechanism, wherein said program causes the computer to detect knocking of said variable cylinder internal combustion engine; perform a knocking control to correct an ignition timing toward a retarding side when knocking is detected; determine whether or not said cylinder pausing mechanism fails; and suspending said knocking control when said cylinder pausing mechanism is determined to fail.

6. An engine control unit according to claim 5, wherein said program further causes the computer to learn in relation to said knocking control during said knocking control; and disable the learning when said knocking control is suspended.

* * * * *